United States Patent
Tsai

(10) Patent No.: US 7,006,272 B2
(45) Date of Patent: Feb. 28, 2006

(54) COLOR CHANGEABLE PIXEL

(75) Inventor: Hsiung-Kuang Tsai, Taipei (TW)

(73) Assignee: Prime View International Co., Ltd., Hsinchu (TW)

( * ) Notice: Subject to any disclaimer, the term of this patent is extended or adjusted under 35 U.S.C. 154(b) by 0 days.

(21) Appl. No.: 10/901,163

(22) Filed: Jul. 29, 2004

(65) Prior Publication Data

US 2005/0068606 A1 Mar. 31, 2005

Related U.S. Application Data

(62) Division of application No. 10/670,734, filed on Sep. 26, 2003.

(51) Int. Cl.
*G02F 1/03* (2006.01)
*G02F 1/07* (2006.01)

(52) U.S. Cl. ............... 359/242; 359/247; 359/267; 359/290

(58) Field of Classification Search ................ 359/238, 359/240, 242–44, 247, 250, 252, 263, 265, 359/267, 278, 287, 290–1, 318, 315–6
See application file for complete search history.

(56) References Cited

U.S. PATENT DOCUMENTS

| | | | |
|---|---|---|---|
| 5,835,255 A | 11/1998 | Miles | 359/291 |
| 6,172,797 B1 | 1/2001 | Huibers | 359/291 |
| 6,195,196 B1 * | 2/2001 | Kimura et al. | 359/295 |
| 6,215,579 B1 | 4/2001 | Bloom et al. | 359/298 |
| 6,421,109 B1 * | 7/2002 | Popovich | 349/202 |
| 6,650,455 B1 | 11/2003 | Miles | 359/257 |
| 6,674,562 B1 | 1/2004 | Miles | 359/291 |
| 2004/0125281 A1 * | 7/2004 | Lin | 349/113 |

* cited by examiner

*Primary Examiner*—Jordon Schwartz
*Assistant Examiner*—Jessica Stultz
(74) *Attorney, Agent, or Firm*—Sughrue Mion, PLLC

(57) ABSTRACT

A color changeable pixel comprises a first plate, a second plate and a third plate. The three plates are settled in parallel. The second plate is a deformable and reflective plate. An incident light from one side of the first plate is modulated and only specific frequency light reflects by the second plate. The frequency of the reflected light is related to the distance between the first plate and the second plate. The second plate shifts by the voltage added on the third plate to change the distance between the first plate and the second plate. Therefore, the frequency of the reflected light is altered.

13 Claims, 3 Drawing Sheets

COLOR CHANGEABLE PIXEL

This is a divisional of Application No. 10/670,734 filed Sep. 26, 2003. The entire disclosure(s) of the prior application(s), application number(s) 10/670,734 is considered part of the disclosure of the accompanying Divisional application and is hereby incorporated by reference.

BACKGROUND OF THE INVENTION

1. Field of Invention

This invention relates to a color changeable pixel. More particularly, this invention relates to the color changeable pixel of an optical interference display plate.

2. Description of Related Art

Due to the properties of being light and small in size, a display plate is favorable in the market of the portable display and displays with space limits. To date, in addition to Liquid Crystal Display (LCD), Organic Electro-Luminescent Display (OLED) and Plasma Display Panel (PDP), a module of the optical interference display has been investigated.

Referring to U.S. Pat. No. 5,835,255, an array of modulator of the visible light which can be used in a display plate has been revealed. FIG. 1 shows a cross-section view of a prior art modulator. Every modulator 100 comprises two walls, 102 and 104. These two walls are supported by post 106, and a cavity 108 is subsequently formed. The distance between these two walls, that is, the length of cavity 108, is D. One of the wall 102 and wall 104 with an absorption factor is a semi-transparent layer which absorbs visible light partially. Another is a light reflective layer which is deformable when the voltage is applied. When the incident light goes through wall 102 or 104 and arrives at cavity 108, only the visible light with the wavelength corresponding to the formula 1.1 is able to be output, that is, $$2D=N\lambda \quad (1.1),$$

wherein N is a natural number.

When the length of cavity 108, D, equals half of the wavelength times any natural number, a constructive interference is produced and a sharp light wave is emitted. At the mean time, if the observer follows the direction of the incident light, a reflective light with wavelength $\lambda 1$ can be observed. Therefore, modulator 100 is "opened".

FIG. 2 shows a cross-section view of a modulator after a voltage is applied. As shown in FIG. 2, because of the voltage wall 104 is deformed and falls down towards wall 102. The distance between wall 102 and 104, that is, the length of cavity 108 is not exactly zero. It is d, and d can be zero. If we used d instead of D in formula 1.1, only the visible light with a wavelength fulfilling formula 1.1, which is $\lambda 2$, is able to produce a constructive interference and goes through. Due to the high absorption rate of wall 102 for light with wavelength $\lambda 2$, all the incident visible light would be filtered, therefore the observer who follows the direction of the incident light is not able to observe any reflected visible light. The modulator is now "closed".

An array of modulators comprising modulator 100 is sufficient for a single colored display plate, but not for a color planar display. A method known to the art is to manufacture a pixel which comprises three modulators with different lengths of the cavities. FIG. 3 and FIG. 4 are cross-section views for the color planar displays comprising modulator known to the arts. FIG. 3 shows a cross-section view for a prior art multi-layered color planar display. Multi-layered color planar display 200 comprises three layers, modulators 202, 204 and 206. An incident light 208 is reflected by modulators 202, 204 and 206. The wavelengths of the reflected light are different, for example, they can be red light, green light and blue light. The reasons to have reflected light with three different wavelengths is that the length of the cavities of modulators 202, 204 and 206 are different, and also different reflective mirrors are used. One of the disadvantages of a multi-layered color planar display is its poor resolution. Also, as shown in FIG. 3, the blue light is less bright than the red light.

FIG. 4 shows a cross-section view for a prior at matrix color planar display. Three modulators, modulators 302, 304 and 306 are formed on a substrate 300. An incident light 308 is reflected by modulators 302, 304 and 306. The wavelengths of the reflected light are different, for example, they are red light, green light and blue light. The reason to have reflected light with three different wavelengths is that the lengths of the cavities of modulators 302, 304 and 306 are different. It is not required to use different reflective mirrors. The resolution is good, and the brightness of every color light is similar. However, modulators with three different lengths of cavities need to be manufactured separately, for example, the region for forming the modulators 304 and 306 is shielded by photo-resist while the process for forming the modulator 302 is performed. The manufacturing process is complicated and the yield is low. Moreover, the errors introduced during the manufacturing process, for instance, the errors of the lengths of cavities may cause red shift or blue shift. The mistake is uncorrectable and the substrate is wasted.

Therefore, it is important to develop a color optical interference display plate which has high resolution and brightness and is easy to manufacture.

SUMMARY OF THE INVENTION

One objective of this invention is to provide a color changeable pixel applied in the production of multicolor optical interference display plate. The resolution and brightness of the color changeable pixel is high.

The second objective of this invention is to provide a color changeable pixel applied in the production color optical interference display plate. The manufacturing process is simple and the yield of the manufacture is high.

The third objective of this invention is to provide a color changeable pixel applied in the production of color optical interference display plate. The correction for the errors introduced during the manufacturing process is possible.

According to the objectives of this invention, one of preferred embodiments of the present invention provides a modulator which can be used as a color changeable pixel. It comprises at least a first plate, a second plate and a third plate. The three plates are set in parallel, and the second plate is settled between the first and the third plate. The first plate is a semi-transparent electrode, and the second plate is a deformable reflective electrode. The two plates are supported by posts and a cavity is formed. The length of the cavity is D.

When the modulator is "open", there is no voltage applied on the first and second plate. An incident light from one side of the first plate is modulated and constructive interference is only happened on the light with wavelength fulfilling formula 1.1, which is reflected by the second plate and goes through the first plate. The frequency of the reflected light is related to the length of the cavity. The third plate is an operating electrode and a voltage can be applied on it. Because the second plate shifts when a voltage is applied to the third plate, the distance between the first and the second plate is changed, that is, the length of the cavity is changed. As shown in formula 1.1, the wavelength of the reflected light is altered and different color light, such as red light, green light or blue light is obtained. In addition, it is known that when a second voltage is applied between the first and the second plate, the second plate deforms and falls towards the first plate. The modulator is "closed" and no visible light is reflected.

According to the objectives of this invention, another preferred embodiment of the present invention provides a multicolor planar display with an array of modulators. An array of modulators is formed on the same substrate. Every three modulators form a pixel. A pixel comprises at least a first plate, a second plate and a third plate. The three plates are set in parallel, and the second plate is settled between the first and the third plate. The first plate is a semi-transparent electrode, and the second plate is a deformable reflective electrode. The two plates are supported by a post and a cavity is formed. The length of the cavity is D. When different voltages are applied to two or three of the three third plates of the three modulators, the movable second plates shift and the distances between the first and the second plates are changed, that is, the length of the cavity is changed. Therefore the lengths of these three cavities are different. When the modulator is "open", there is no voltage applied to the first and second plate. According to formula 1.1, the wavelength of the reflected light is altered due to the change of the length of the cavity. Furthermore, it is known that when a second voltage is applied between the first and the second plate, the second plate deforms and falls towards the first plate. The modulator is "closed" and no visible light is reflected.

The color planar display with an array of modulator provided in this invention retains the advantages of a matrix color planar display known to the art, high resolution and brightness, and as well has the advantages of a multilayered color planar display known to the art, simple manufacturing process and high yield. Besides, because the length of the cavity is influenced by the voltage applied on the third plate, the errors of the length of the cavity which is introduced during the manufacturing process can be corrected. Therefore, the yield also raises.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

In order to provide further information of the structure of a color changeable pixel, the first embodiment is provided herein to explain the structure of every modulator in this invention. In addition, the second embodiment is provided to give further information of the optical interference display plate with an array of modulator.

Embodiment 1

Figure 1:
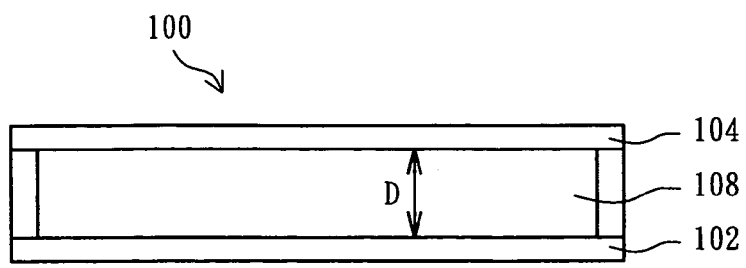
FIG. 1 is a cross-section view of a prior art modulator.
Figure 2:
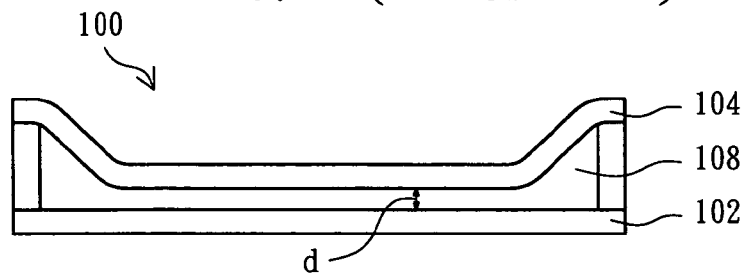
FIG. 2 is a cross-section view of a prior art modulator after a voltage is applied.
Figure 3:
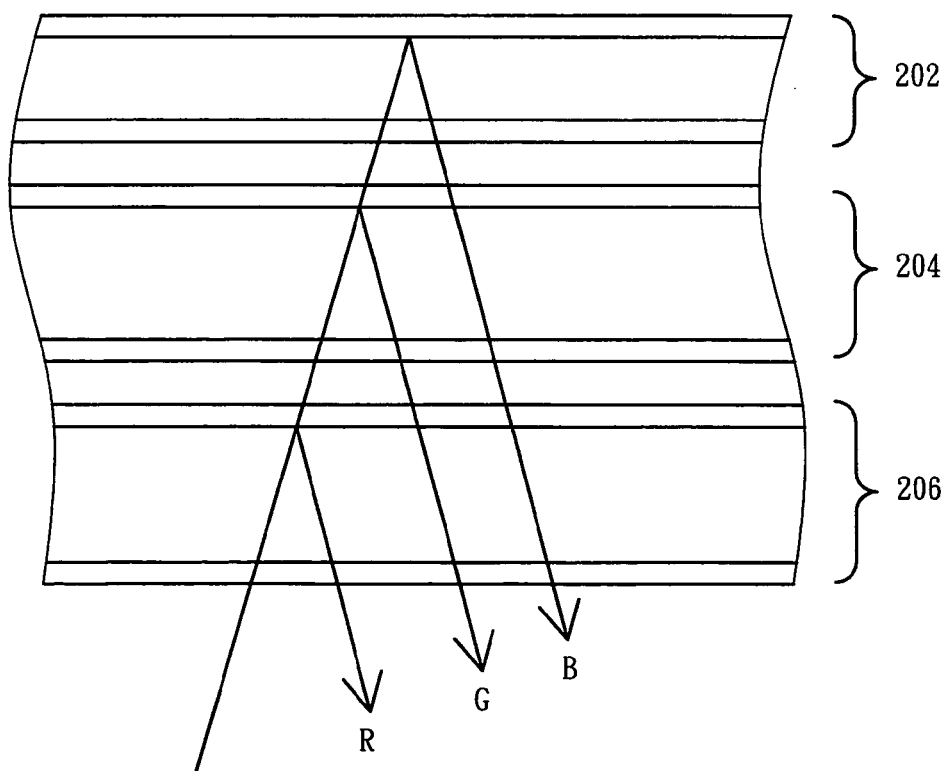
FIG. 3 is a cross-section view for a multi-layered color planar display known to the art.
Figure 4:
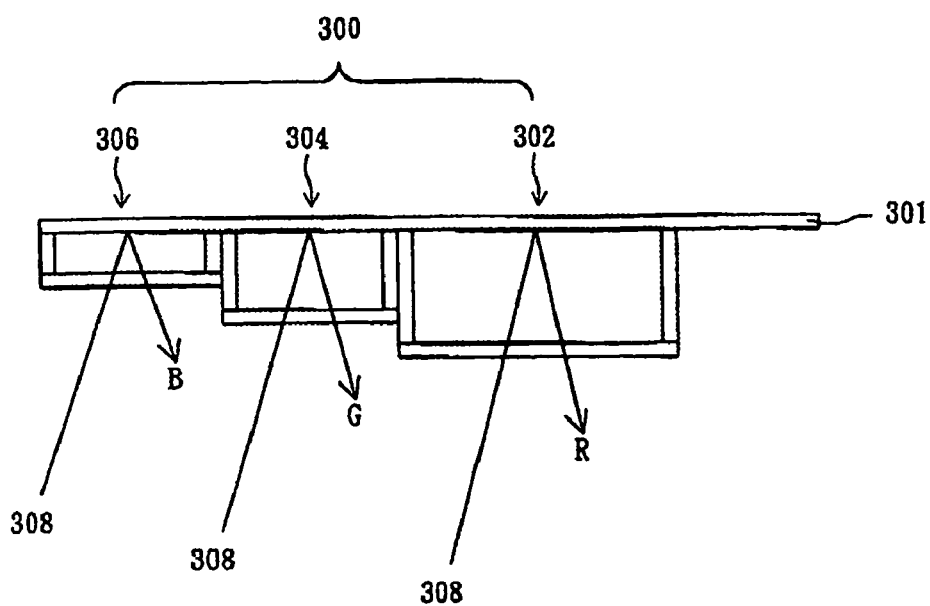
FIG. 4 is a cross-section view for a prior art matrix color display.
Figure 5A:
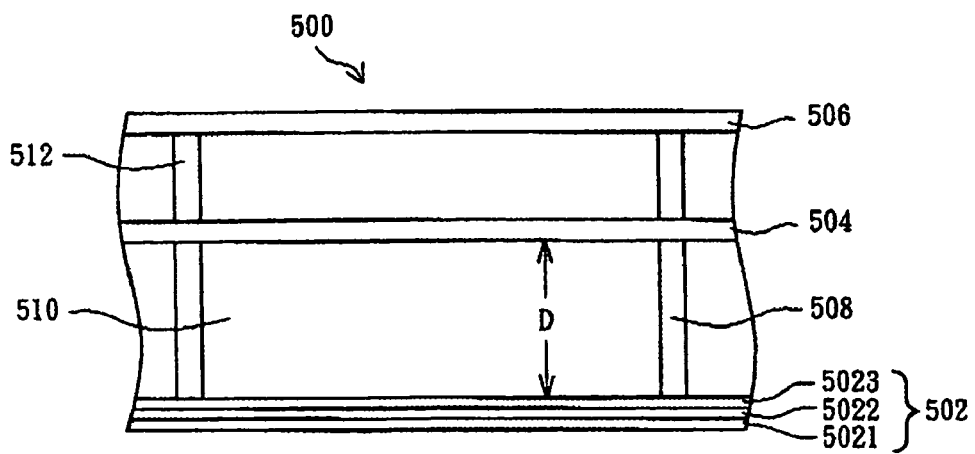
FIG. 5A is a cross-section view of the modulator according to one preferred embodiment of this invention.

Please refer to FIG. 5A. FIG. 5A shows a cross-section view of the modulator provided in the first embodiment of this invention. A modulator 500 which functions as a color changeable pixel comprises at least a first plate 502, a second plate 504 and a third plate 506. The three plates are set in parallel, and the second plate 504 is settled between the first plate 502 and the third plate 506. The first plate 502 and the second plate 504 are selected from the group consisting of narrowband mirrors, broadband mirrors, non-metal mirrors, metal mirrors and the combination thereof.

The first plate 502 is a semi-transparent electrode which comprises a conductive substrate 5021, an absorption layer 5022, and a dielectric layer 5023. An incident light going through light incidence electrode 502 is partially absorbed by the absorption layer 5022. The conductive substrate 5021 is made from a conductive transparent material, such as ITO and IZO. The absorption layer 5022 is made from metal, such as aluminum or silver. The dielectric layer 5023 is made from silicon oxide, silicon nitride or metal oxide, which can be obtained by oxidation of part of the absorption layer 5022. The second plate 504 is a deformable reflective electrode. It shifts by the voltage applied. The second plate 504 is made from a dielectric material/conductive semi- or non-transparent material, or metal/conductive transparent material.

The two plates 502 and 504 are supported by a post 508 and a cavity 510 is formed. The length of the cavity is D. The second plate 504 and the third plate 506 are also supported by a post 512.

When the modulator 500 is "open", the length of cavity 510 is D. An incident light 514 from one side of the first plate 502 is modulated in cavity 510 and only light with wavelength fulfilling formula 1.1 is reflected by the second plate 504 and goes through the first plate 502. The frequency of the reflected light is related to the length of the cavity.

Figure 5B:
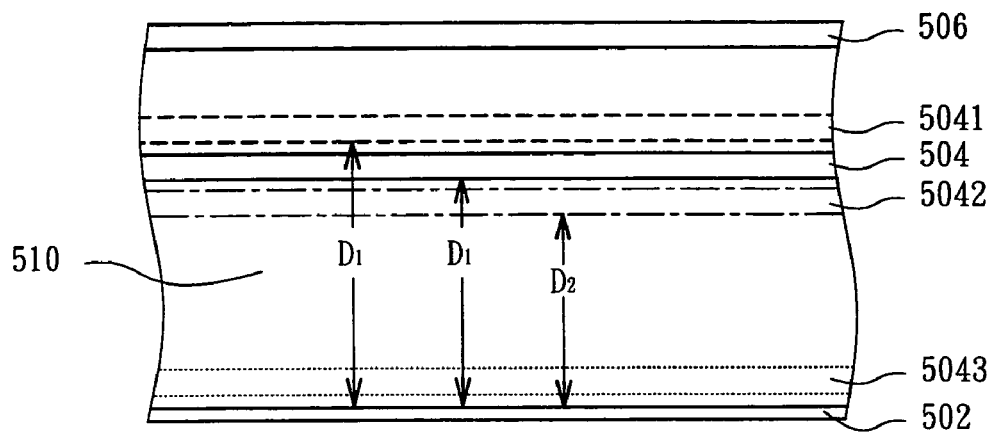
FIG. 5B is a cross-section view of the third plate of the modulator according to one preferred embodiment of this invention.

Referring is made to the FIG. 5B, FIG. 5B is a cross-section view of the third plate in the modulator. As shown in FIG. 5B, the second plate 504 shifts when a voltage $V_1$ applied to the third plate 506. The second plate 504 either comes closer to (in position 5041) or farer away from (in position 5042) the third plate 506. The distance between the first plate 502 and the second plate 504, that is, the length D of the cavity 501 is therefore changed and the length of the cavity is changed from D to $D_1$ or $D_2$. As shown in formula 1.1, the wavelength of the reflected light is altered due to the change of the length of cavity 501. Light with different color, such as red light, green light or blue light is obtained.

Further referring is made to FIG. 5B, it is also shown in FIG. 5B that when a second voltage $V_2$ is applied between the first plate 502 and the second plate 504, the second plate 504 deforms and falls towards the first plate 502 (position 5043). Modulator 500 is "closed" and no visible light is reflected.

For a single colored optical interference display plate, the usage of the modulator provided in this invention will not complicate the manufacturing process comparing to a modulator known to the art. Besides, because the length of the cavity is influenced by the voltage applied on the third plate, the errors of the length of the cavity introduced during the manufacturing process can be corrected. The yield therefore increases.

Embodiment 2

Figure 6:
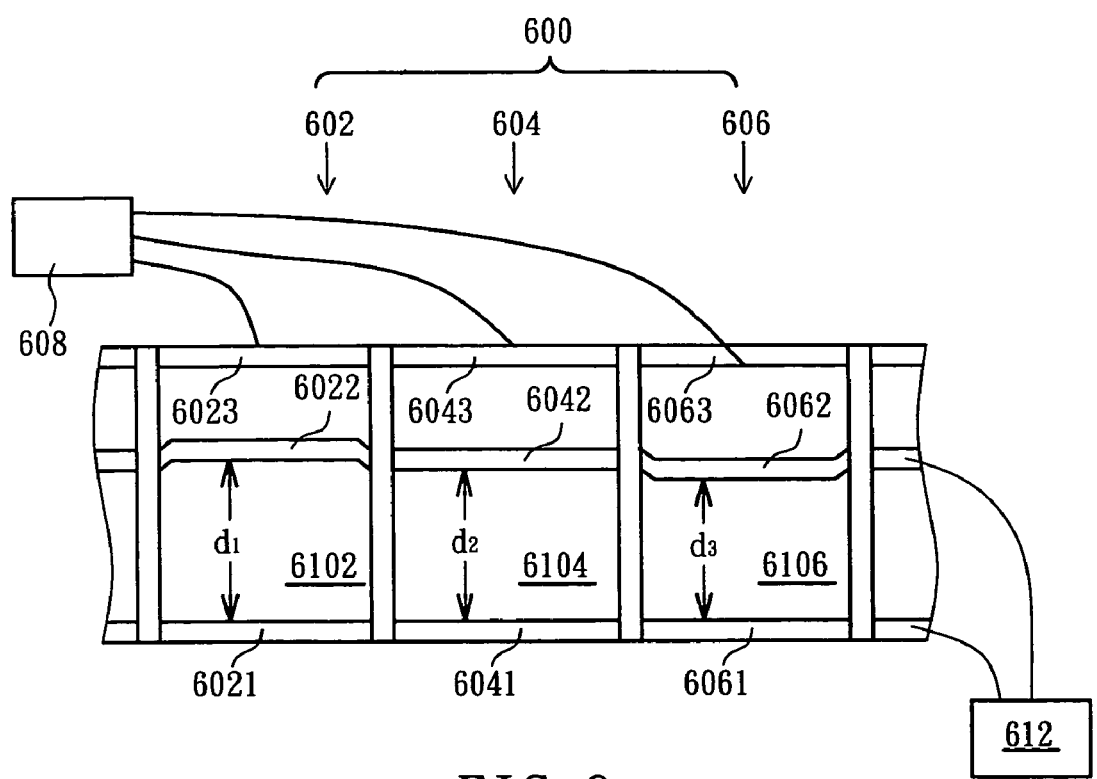
FIG. 6 is a cross-section view of the modulator provided in embodiment 2 of this invention according to one preferred embodiment of this invention.

Referring is made to FIG. 6, FIG. 6 shows a cross-section view of an array of modulator provided in the second embodiment of this invention. An array of modulator 600 comprises three modulators: modulator 602, modulator 604 and modulator 606. Every modulator is a color changeable pixel. The structure of modulators is the same as the one provided in embodiment 1. At least one control circuit 608 is connected to the third plates 6023, 6043 and 6063. It can apply to all third plates together or separately. The voltage added to the third plates 6023, 6043 and 6063 is either identical or different. Since the second plates 6022, 6042 and 6062 are movable reflective plates, they are influenced by the voltages applied on the third plates 6023, 6043 and 6063. The distance between the first plate 6021, 6041 and 6061 and the second plate 6022, 6042 and 6062, that is, the length D of the cavity 610 is changed. The lengths of the cavities 6102, 6104 and 6106, that is, d1, d2 and d3 are therefore different. As shown in formula 1.1, the wavelength of the reflected light is altered due to the change of the length of cavity. Light with different color, such as red light, green light or blue light is obtained.

Besides, it is known that when a driver circuit 612 is connected to modulator 602, 604 and 606, a voltage is added between the first plates 6021, 6041 and 6061 and the second plates 6022, 6042 and 6062 together or separately. The second plate 6022, 6042 and 6062 deform and fall towards the first plate 6021, 6041 and 6061. All or part of the modulators (602, 604 and 606) are "closed". No visible light is reflected, or light with different color is obtained.

The color planar display with an array of modulator provided in this invention retains the advantages of a prior art matrix color planar display known to the art, high resolution and brightness, and as well has the advantages of a multi-layered color planar display known to the art, simple manufacturing process and high yield. Comparing to a matrix color planar display known to the art, the length of the cavities of all modulators is the same since the change of the length is controlled by the control IC. Therefore the production of modulators with different length of cavities is not required. The manufacturing process is simple and yield is high. Compared to a multi-layered color planar display known to the art, all the modulators are on the same surface, therefore an incident light does not need to go through multi-layered modulators. The resolution and brightness are high. Besides, in a prior art multi-layered color planar display, in order to make an incident light to go through a first modulator and be reflected by a second modulator efficiently, the composition and thickness of the first plate and the second plate of three types of modulators are different. The manufacturing process is actually more complicated than expected. Manufacturing modulators provided in this invention is less difficult than the modulator known to the art.

In addition, because the length of the cavity is influenced by the voltage applied on the third plate, the errors of the length of the cavity introduced during the manufacturing process can be corrected. The yield therefore raises.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical interference color planar display, comprising:
   a control circuit;
   a driver circuit; and
   a modulator array comprising:
   a first plate;
   a second plate;
   an operating plate;
   at least one first post located between the operating plate and the second plate, wherein the second plate is directly connected to the first post; and
   at least one second post located between the first plate and the second plate, wherein a cavity is formed between the first plate and the second plate, and an incident light from one side of the first plate is modulated and a reflected light of only specific frequency is reflected by the second plate, and the second plate directly contacts and shifts along the first post towards the operating plate and directly contacts and shifts along the second post towards the first plate by a voltage added on the operating plate so as to change the distance of the cavity, thereby changing the frequency of the reflected light;
   wherein the control circuit connects to the operating plate to control the length of the cavity of a modulator of the modulator array for reflecting the reflected light with a special wave length, and the driver circuit connects to the first plate and the second plate to control the on or off of the modulator.

2. The optical interference color planar display of claim 1, wherein the first plate at least comprises:
   a substrate;
   an absorption layer; and
   a dielectric layer.

3. The optical interference color planar display of claim 2, wherein the substrate is a transparent conductive substrate.

4. The optical interference color planar display of claim 2, wherein a material for forming the dielectric layer is silicon oxide, silicon nitride or metal oxide.

5. The optical interference color planar display of claim 2, wherein the absorption layer is made from metal.

6. The optical interference color planar display of claim 2, wherein the substrate is made from IZO glass.

7. The optical interference color planar display of claim 1, wherein the first plate and the second plate are selected from the group consisting of narrowband mirror, broadband mirror, non-metal mirror; and the combination thereof.

8. The optical interference color planar display of claim 1, wherein the second plate is a deformable plate.

9. The optical interference color planar display of claim 1, wherein the second plate is a moveable plate.

10. The optical interference color planar display of claim 1, wherein the second plate at least comprises a dense material or a semi-transparent material.

11. The optical interference color planar display of claim 10, wherein the semi-transparent material is IZO.

12. The optical interference color planar display of claim 2, wherein the substrate is made from ITO glass.

13. The optical interference color planar display of claim 10, wherein the semi-transparent material is ITO.

* * * * *